United States Patent [19]

Hoyss

[11] 4,311,935
[45] Jan. 19, 1982

[54] COOLING FOR BRUSHES OF ELECTRIC MOTORS

[75] Inventor: Franz Hoyss, Bad Tölz, Fed. Rep. of Germany

[73] Assignee: Palar (Curacao) N.V., Netherlands Antilles

[21] Appl. No.: 87,306

[22] Filed: Oct. 22, 1979

[30] Foreign Application Priority Data

Oct. 23, 1978 [DE] Fed. Rep. of Germany ....... 2846069

[51] Int. Cl.³ .............................................. H01J 17/20
[52] U.S. Cl. ..................................... 310/227; 310/239
[58] Field of Search ............... 310/238, 239, 241, 242, 310/245, 247, 52, 68 R, 71, 58, 60 R, 88, 227, 228

[56] References Cited

U.S. PATENT DOCUMENTS 2,389,214  11/1945  Shobert ............................... 310/227
2,744,205   5/1956  Kalikow .......................... 310/239 X
3,919,574  10/1975  Schmuck ......................... 310/239 X

FOREIGN PATENT DOCUMENTS 665377  9/1938  Fed. Rep. of Germany .

Primary Examiner—Mark O. Budd
Attorney, Agent, or Firm—Toren, McGeady & Stanger

[57] ABSTRACT

In an electromotor having a stator and a rotor, a collector is located on the rotor and carbon brushes are movably supported in carbon supports relative to the outer circumferential periphery of the collector. Segment-shaped shells are located on the upstream sides of the carbon brushes and cover an angular part of the outer circumferential periphery of the collector. Downstream of the carbon brushes the outer circumferential periphery of the collector is uncovered. Accordingly, the collector can be cooled while protecting the collector and carbon brushes from contamination.

11 Claims, 4 Drawing Figures

COOLING FOR BRUSHES OF ELECTRIC MOTORS

SUMMARY OF THE INVENTION

The present invention is directed to an electromotor with a stator and a rotor, and with carbon brushes movably supported in a carbon support and located on a collector positioned on the rotor.

At the present time, electromotors are used in almost all fields of technology and, in addition, have many everyday applications. One problem which has been experienced is the contamination of the motors over a period of use. Electromotors used in manual devices or appliances are constructed as small as possible for weight and cost reasons. As a result, the cooling of such motors, which is effected by flowing air through or around the motor, is very important. With the flow of cooling air, dust and other small solid particles, such as sand grains, penetrate the electromotor. In the motor, solid particles such as sand grains lead to excessive wear of the movable parts and result in a significant reduction in useful life. Wear of this type is particularly noted in the collector and the carbon brushes acting on the collector. In most of the electromotors used at the present time, the collector and the contact points of the carbon brushes are completely unprotected and, therefore, are subject to extreme wear. Since the collector is welded or soldered to the rotor windings, the entire rotor must be replaced when the collector is damaged. Such replacement involves significant costs.

To overcome this problem, in the past it has been suggested to enclose the collector within a ring around its entire circumference. Such an enclosure is supposed to prevent the direct impingement of foreign particles on the collector. This solution, however, has been found to be disadvantageous in practice. In a collector which is surrounded by a ring over its entire circumference, only a small portion of the cooling air flow can reach the bars or segments at the circumference of the collector. Insufficient cooling results and leads, in time, to overheating of the collector. In turn, overheating may result in the separation of the connection wires of the rotor windings. Moreover, the insulation of the collector and the wires may be damaged. Although the enclosing ring is present, contamination still reaches the remaining gap and forms a solid layer which in the course of time bridges the gap and is in permanent sliding or rubbing contact with the collector.

For completely different reasons, it has also been known to enclose the collector on all sides. In such an enclosure, the collector is completely sealed not only over its entire circumference but also laterally. This complete enclosure has been utilized in electromotors for mining applications where so-called firedamp could be ignited by sparks developed at the collector. In a completely enclosed design, however, the collector is not cooled at all. Accordingly, it has been suggested to enclose only the carbon brushes and to arrange sealing flanges against the surface of the collector on the opposite sides of the carbon brush. In such a design, a portion of the circumferential peripheral surface of the collector remains free or exposed. Due to the sealing of flanges located on both sides of the carbon brushes, it became necessary to extend the mica insulating layers arranged between the individual collector bars to the collector surface. This change resulted in increased wear of the carbon brushes, because of the hard mica insulating layers.

Therefore, the primary object of the present invention is to provide a partial enclosure for the collector of an electromotor which affords effective protection against contamination of the collector and the carbon brushes while providing sufficient cooling of the collector.

In accordance with the present invention, the collector is covered for a portion of its circumferential periphery by arcuately shaped segment-like shells while the remainder of the circumferential periphery is left uncovered. The shells project angularly from the upstream sides of the carbon brushes, that is, the sides facing in the direction opposite to the direction of rotation of the rotor, over the adjacent circumferentially extending surface of the collector.

Accordingly, the circumferential periphery of the collector is covered only on the upstream sides of the carbon brushes while on the downstream sides it is left uncovered. In this arrangement, the flow of cooling air cannot reach the collector in the region of the carbon brushes. The arcuately shaped shells extend over the collector closely spaced from its circumferential surface. Because of this arrangement of the shells, a thin air gap remains between the shells and the collector with the flow velocity being significantly reduced and the amount of air also reduced. Therefore, excess pressure is built up between the circumferential surface of the collector and the shells which prevents dust from penetrating into the narrow air gap.

To facilitate effective protection of the collector while providing it with sufficient cooling, it is advantageous if each segment-shaped shell extends for an angle of about 40°–90° over the circumferential periphery of the collector. In such an arrangement, at least half of the circumferential surface of the collector remains uncovered and is accessible to the flow of cooling air. The angularly extending shells covering the collector are sufficient to prevent the formation of a distinct flow of the cooling air through the gap between the shell and the collector.

As a rule, cooling air flows in the axial direction of electromotors. To prevent a part of the flow of cooling air from flowing under the shells covering the collector, it is advantageous that the shells bear against a collar surrounding the free end of the rotor shaft located beyond the collector. The collar can have an annular shape or consist of individual segments located in alignment with the shells. This arrangement of the collar and the shells permits the flow of cooling air to be conveyed in an optimum manner. The shells are supported by the collar in the axial direction of the electromotor.

For simple and economical production, it is advantageous if each shell is constructed as a unitary member with the carbon support. Such a design makes for easier assembly. Due to the unitary design, additional elements for securing the shell on a carbon support are not required. In addition, the carbon supports and the shells can be made of the same material, preferably an insulating material. Furthermore, significant cost reductions are possible if pressure or injection molding is used in forming the unitary elements.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAIL DESCRIPTION OF THE INVENTION

Figure 1:
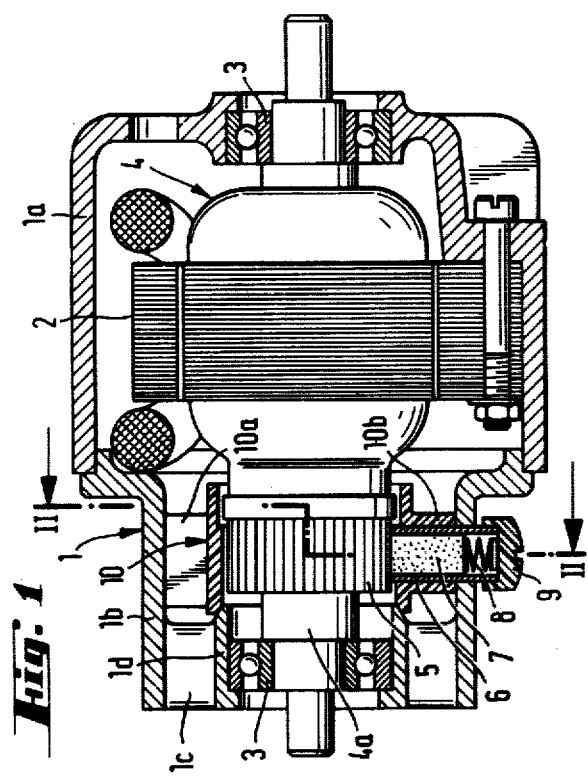
FIG. 1 is an axially extending view, partly in section, of an electromotor embodying the present invention, with the section taken along the lines I—I in FIG. 2.
Figure 2:
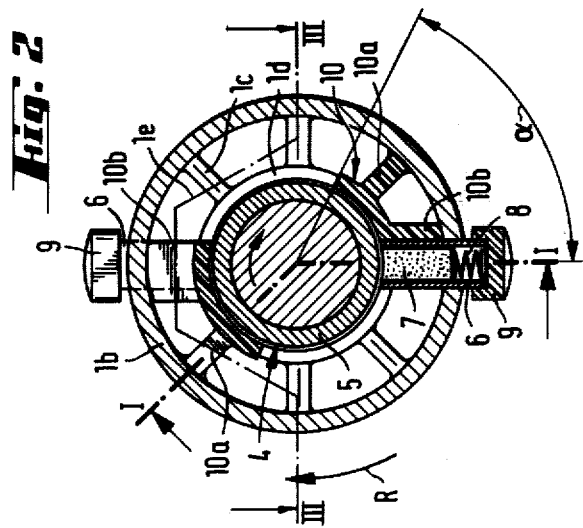
FIG. 2 is a sectional view of the electromotor in FIG. 1 taken along the line II—II.

In FIG. 1 an electromotor embodying the present invention is illustrated and it consists of an axially extending housing 1 with a stator 2 fastened within the housing. As viewed in FIG. 1, the right-hand part of the housing 1 is the front portion 1a and the left-hand part is the rear portion 1b. The front and rear portions are connected together. In the housing 1, a rotor 4 is rotatably supported in bearings 3 located adjacent the front and rear ends of the housing. A rotor shaft 4a extends from the rotor toward the rear end of the housing and a collector 5 is positioned on the rotor shaft. Carbon supports 6 are located in the rear portion 1b of the housing and extend radially from adjacent the collector outwardly beyond the outer surface of the rear portion. Carbon brushes 7 are movably supported in the carbon supports 6. The radially outer end of each carbon support is closed by a cover 9 and a spring 8 extends between the cover and the carbon brush 7 for pressing it inwardly against the collector 5. As can be seen in FIG. 2, segment-shaped shells 10 extend over a portion of the circumferential periphery of the collector 5. Cooling air containing foreign particles flows through the housing 1 and the shells 10 prevent the cooling air from flowing over a portion of the collector 5. On the rear end side of the housing 1, the shells 10 bear against an annular collar 1d spaced inwardly from and connected to the rear portion 1b of the housing by radially extending webs 1c. Collar 1d can completely encircle the free end of the rotor shaft 4a or it can be limited to an angular extent aligned with the shells 10, 20(note FIG. 4). Cooling air is prevented from entering between shells 10, 20 and the collector 5 due to the contacting arrangement with the collar 1d.

In FIG. 2, the diametrically opposed carbon supports are shown extending radially outwardly from the circumferential periphery of the collector through the rear portion 1b of the housing 1 with the covers 9 located on the radially outer ends of the supports. Further, the radially extending webs 1c are shown which interconnect the radially inner collar 1d to the rear portion 1b of the housing. In FIG. 2 an arrow R indicates the direction of rotation of the rotor 4. The carbon brushes 7 have sides which face in the direction opposite to the direction of rotation of the rotor 4. The shells 10 are located on these upstream sides of the carbon brushes 7. The radially inner portions of the shells 10 cover an angularly extending part of the circumferential periphery of the collector 5. The shells 10 extend for an angle α in the range of 40° to 90°. Furthermore, as can be seen in FIG. 1, the shells 10 extend in the axial direction of the rotor from both sides of the collector 5. The shells 10 have ribs 10a which are spaced angularly from the part of the shell contacting the carbon support. The ribs 10a radially support the shells 10 on the rear portion 1b of the housing. Openings 1e are located between adjacent ribs 1c through which cooling air can flow.

Figure 3:
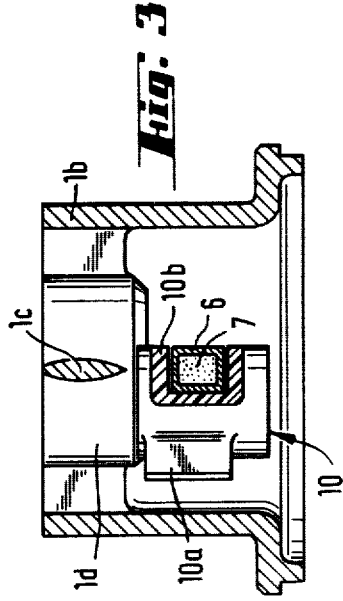
FIG. 3 is a sectional view of a portion of the electromotor taken along the line III—III in FIG. 2.

In FIG. 3, the rotor 4 and the collector 5 are not shown. In this figure, the webs 1c are shown extending between the inner collar 1d and the rear portion 1b of the housing. It can be noted that webs 1c have a streamline cross section which provides advantageous flow patterns. Shells 10 are held in position by the collar 1d. Further, each shell 10 is held by its rib 10a which bears against the inner surface of the rear portion 1b of the housing. Moreover, in FIG. 3 it can be seen that each shell 10 includes a projecting part 10b enclosing three sides of the carbon support 6. In other words, the projecting part 10b has a C-shaped section in FIG. 3 so that it covers the upstream side of the carbon support as well as the sides which extend between the upstream side and the downstream side. Moreover, as can be appreciated from FIG. 1, this projecting part 10b serves as a support for the shell 10 in the rear portion 1b of the housing.

Figure 4:
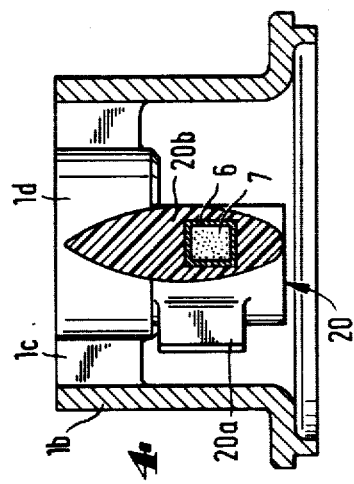
FIG. 4 is a sectional view, similar to FIG. 3, illustrating another embodiment of the invention.

FIG. 4 illustrates another embodiment of the electromotor in accordance with the present invention. Unlike the arrangement shown in FIG. 3, however, a projection 20b of shell 20 has a streamlined shape and completely encloses the carbon support 6. Accordingly, the shells 20 are constructed as a unit with the carbon support 6. Angularly spaced from the projection 20b of the shell 20 is a rib 20a which affords support for the shell in the rear portion 1b of the housing. The shell 20 includes an angularly projecting part extending from the upstream side of the carbon brush 7 and covering the circumferential periphery of the collector in the same manner as shell 10.

What is claimed is:

1. An electromotor including a stator, a rotor having an axis of rotation and being rotatable relative to said stator, a collector positioned on said rotor, carbon brushes positioned adjacent the circumferential periphery of said collector and extending radially outwardly from said collector, means for supporting said carbon brushes, said carbon brushes being movably supported by said support means, said rotor having a direction of rotation around the axis thereof, wherein the improvement comprises that said support means laterally enclose said carbon brushes, said carbon brushes have a first side facing in the direction of rotation of the rotor and a second side facing in the opposite direction, a segment-shaped shell closely covering said support means on the second side of each said carbon brush and extending from the second side of each said carbon brush in the circumferential direction of said collector opposite to the direction of rotation of said collector and closely covering said collector for an angular part of the circumferential periphery thereof extending from the second side of each said carbon brush with an angular part of said collector extending from the first side of said carbon brushes in the direction of rotation of said collector being uncovered for providing sufficient cooling of said collector while affording effective protection of said collector and carbon brushes from contamination by at least limiting the flow of cooling air thereover.

2. An electromotor, as set forth in claim 1, wherein a pair of said carbon brushes being located on opposite sides of said collector and said segment-shaped shells extending in the circumferential peripheral direction of said collector for an angular portion thereof in the range of 40° to 90° so that at least half of the circumferential periphery of said collector remains uncovered.

3. An electromotor, as set forth in claims 1 or 2, wherein said rotor includes a rotor shaft extending axially from said collector, a housing extending in the axial direction of said rotor and laterally enclosing said rotor and rotor shaft, said housing including a collar at least partially encircling said rotor shaft and spaced axially from said collector, said collar having the end thereof closer to said collector bearing against a radially inner portion of said shell for holding said shell in place.

4. An electromotor, as set forth in claim 1, wherein said segment-shaped shell is formed as a unit with said carbon support from which it extends.

5. An electromotor, as set forth in claim 3, wherein said housing having a first axially extending part laterally enclosing said rotor and a second axially extending part laterally enclosing said collector and said rotor shaft, radially extending ribs interconnecting said collar and said second axially extending part with said ribs disposed in angularly spaced relation around the axis of said rotor and with adjacent said ribs forming openings therebetween for the flow of cooling air.

6. An electromotor, as set forth in claim 5, wherein said segment-shaped shells each have a rib spaced angularly from said carbon support with which the shell is associated and extending radially outwardly into contact with the inner surface of said second axially extending part of said housing.

7. An electromotor, as set forth in claim 2, wherein said segment-shaped shells each have a projection enclosing the upstream side of said carbon support and the sides of said carbon support extending between the upstream and downstream sides.

8. An electromotor, as set forth in claim 7, wherein each said shell extends in the axial direction of said rotor from each of the sides of said carbon support extending transversely of the rotor axis.

9. An electromotor, as set forth in claim 5, wherein said ribs have a streamline shape in the axial direction of said rotor.

10. An electromotor, as set forth in claim 4, wherein each said segment-shaped shell has a radially extending projection at said carbon support from which the shell extends angularly, said projection of said shell laterally encloses said carbon support.

11. An electromotor, as set forth in claim 10, wherein said projection has a streamline shape in the axial direction of said rotor.

* * * * *